United States Patent
Keshava (10) Patent No.: US 10,749,836 B2
(45) Date of Patent: Aug. 18, 2020

(54) SLAVE DEVICE FOR PERFORMING ADDRESS RESOLUTION PROTOCOL AND OPERATING METHOD THEREOF

(71) Applicant: SAMSUNG ELECTRONICS CO., LTD., Suwon-si, Gyeonggi-do (KR)

(72) Inventor: Sunil Keshava, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 92 days.

(21) Appl. No.: 16/007,405

(22) Filed: Jun. 13, 2018

(65) Prior Publication Data

US 2019/0132277 A1    May 2, 2019

(30) Foreign Application Priority Data

Oct. 26, 2017    (KR) .................. 10-2017-0140316

(51) Int. Cl.
*H04L 29/12* (2006.01)
*H04L 12/40* (2006.01)

(52) U.S. Cl.
CPC ........ *H04L 61/10* (2013.01); *H04L 12/40013* (2013.01); *H04L 61/103* (2013.01); *H04L 61/2007* (2013.01); *H04L 61/2061* (2013.01); *H04L 61/6022* (2013.01); *H04L 61/6095* (2013.01)

(58) Field of Classification Search
None
See application file for complete search history.

(56) References Cited

U.S. PATENT DOCUMENTS

| | | | |
|---|---|---|---|
| 7,313,136 B2 | 12/2007 | Villefrance et al. | |
| 7,743,269 B2 | 6/2010 | Marks et al. | |
| 8,615,623 B2 | 12/2013 | Hidaka et al. | |
| 8,930,609 B2 | 1/2015 | Natu et al. | |
| 9,355,053 B2 | 5/2016 | Bradley | |
| 9,507,736 B2 | 11/2016 | Shah | |
| 9,645,902 B2 | 5/2017 | Breakstone et al. | |
| 9,684,575 B2 | 6/2017 | Breakstone et al. | |
| 2012/0089854 A1* | 4/2012 | Breakstone | G06F 1/30 713/323 |
| 2013/0318219 A1* | 11/2013 | Kancherla | H04L 49/70 709/222 |
| 2014/0223066 A1 | 8/2014 | Ramachandran | |
| 2016/0055052 A1* | 2/2016 | Hu | G06F 11/10 714/799 |
| 2016/0275027 A1 | 9/2016 | Venkatasubba et al. | |
| 2017/0093618 A1 | 3/2017 | Chanda et al. | |
| 2018/0196603 A1* | 7/2018 | Zhang | G06F 3/0604 |
| 2018/0276013 A1* | 9/2018 | Chandrashekhar | H04L 45/741 |
| 2018/0357187 A1* | 12/2018 | Loewen | G06F 13/1631 |

* cited by examiner

*Primary Examiner* — Joshua Joo
(74) *Attorney, Agent, or Firm* — F. Chau & Associates, LLC (57) ABSTRACT

A slave device includes a first port assigned an address resolution protocol (ARP) address, a plurality of second ports and corresponding endpoints, and a controller configured to receive first commands including the ARP address from the host through the first port, assign slave addresses to the endpoints based on the first commands to enable the second ports to communicate with the host, receive a second command including one of the slave addresses through a corresponding one of the second ports, perform an operation based on the second command to generate a result, and provide a result of the operation to the one second port.

20 Claims, 11 Drawing Sheets

| ARP ENDPOINT# | UDID | SLAVE ADDRESS FOR ENDPOINT |
|---|---|---|
| 1st ARP ENDPOINT | UDID_1 | SLAVE ADD_1 |
| 2nd ARP ENDPOINT | UDID_2 | SLAVE ADD_2 |
| 3rd ARP ENDPOINT | UDID_3 | SLAVE ADD_3 |

ARP TABLE_b

SLAVE DEVICE FOR PERFORMING ADDRESS RESOLUTION PROTOCOL AND OPERATING METHOD THEREOF

CROSS-REFERENCE TO RELATED APPLICATION

This U.S. application claims the benefit of and priority under 35 U.S.C. 119 to Korean Patent Application No. 10-2017-0140316, filed on Oct. 26, 2017, in the Korean Intellectual Property Office, the disclosure of which is incorporated by reference in its entirety herein.

BACKGROUND

1. Technical Field

The inventive concept relates to a slave device communicating with a host or a master, and more particularly, to a slave device performing an address resolution protocol (ARP), and to an operation method thereof.

2. Discussion of Related Art

When the amount of data used by a user is large, a host can be connected to many slave devices to quickly process the data through communication between the host and the slave devices. However, since each slave device may include a plurality of endpoints to support various functions and a large memory space, it can be difficult to manage the communication between the slave devices and the host device.

SUMMARY

At least one embodiment of the inventive concept provides a slave device including a plurality of endpoints and performing efficiently an address resolution protocol (ARP), and an operation method thereof.

According to an exemplary embodiment of the inventive concept, a slave device includes a first port assigned an address resolution protocol (ARP) address, a plurality of second ports and corresponding endpoints, and a controller configured to receive first commands including the ARP address from the host through the first port, assign slave addresses to the endpoints based on the first commands to enable the second ports to communicate with the host, receive a second command including one of the slave addresses through a corresponding one of the second ports, perform an operation based on the second command to generate a result, and provide a result of the operation to the one second port.

According to an exemplary embodiment of the inventive concept, there is provided an operation method of a slave device including a first port including a dedicated address resolution protocol (ARP) port, a plurality of second ports, and a plurality of endpoints corresponding to the second ports. The operation method includes: a controller of the slave device receiving address resolution protocol (ARP) commands from a host via the ARP dedicated port; and the controller assigning slave address to the endpoints in response based on the ARP commands to enable the second ports to communicate with the host.

According to an exemplary embodiment of the inventive concept, there is provided an operation method of a solid state drive (SSD) including a plurality of ports, a plurality of endpoints corresponding to the ports, and a controller to assign respectively slave addresses to the endpoints, the operation method of the SSD, including: initiating, by the controller, an ARP address to an ARP dedicated port among the ports; receiving, by the controller, an ARP related message from a host via the ARP dedicated port; and performing, by the controller, the ARP based on the ARP related message.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
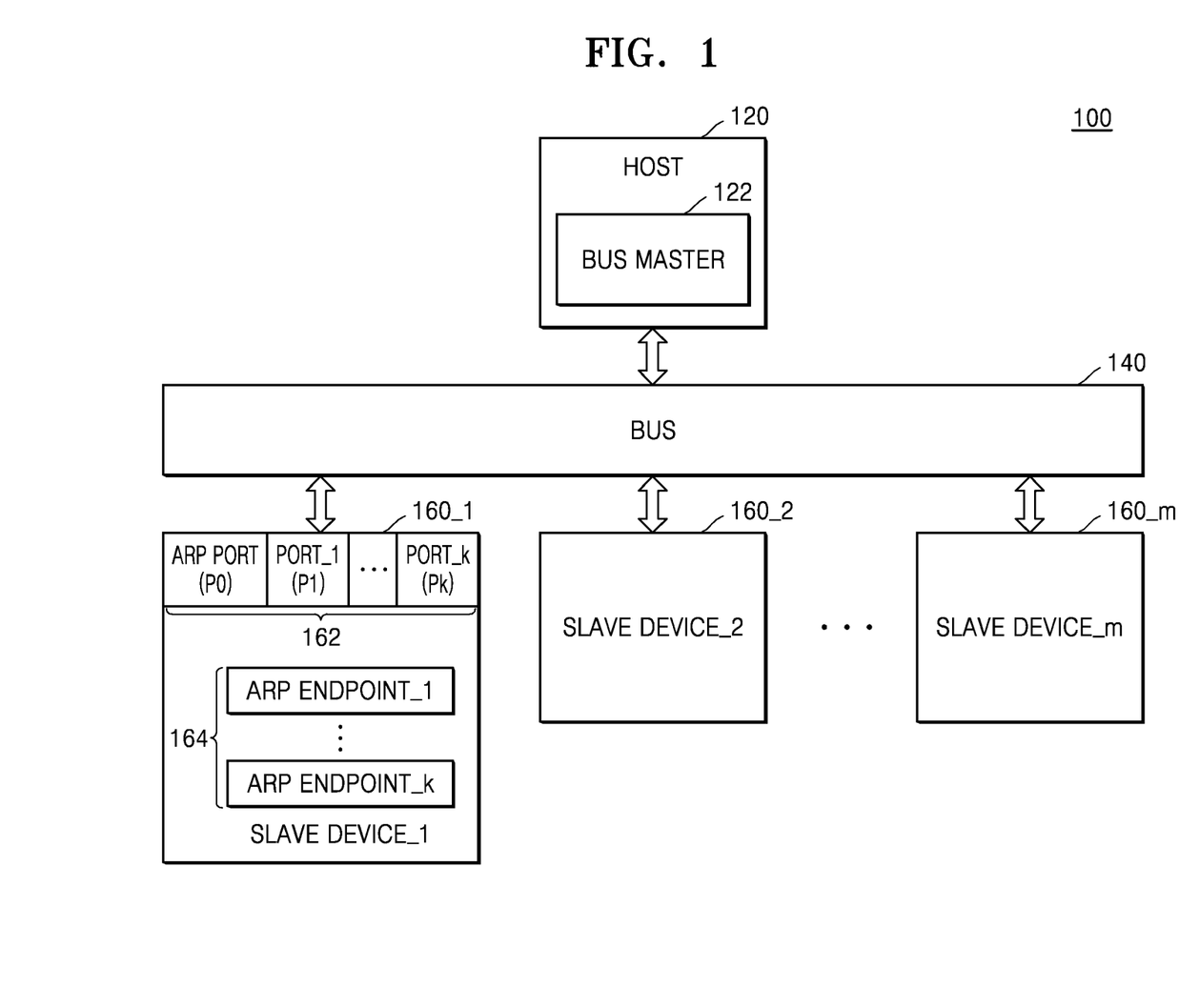
FIG. 1 is a schematic block diagram illustrating a computing system according to an exemplary embodiment of the inventive concept.

FIG. 1 is a schematic block diagram illustrating a computing system 100 according to according to an exemplary embodiment of the inventive concept.

Referring to FIG. 1, the computing system 100 includes a host 120 (e.g., a host device such as a computer), a bus 140, and a plurality of slave devices, that is, first through $m^{th}$ slave devices 160_1 through 160_m. The host 120 is connected to the first through $m^{th}$ slave devices 160_1 through 160_m via the bus 140. In one embodiment, the bus 140 is a bi-directional 2-wire bus used for system communication with the host 120 and may correspond to a system management (SM) bus. In an embodiment, the bus 140 operates based on an inter-integrated circuit (I2C) serial bus protocol and may be referred to as an I2C serial bus. In another embodiment, the bus 140 is a peripheral component interconnect express (PCIe) bus. Hereinafter, the bus 140 will be mainly described as the SM bus for convenience of description, but embodiments of the bus 140 are not limited thereto.

The first through $m^{th}$ slave devices 160_1 through 160_m communicate at a certain bandwidth with the host 120 by using the bus 140. Depending on a type of the bus 140, the first through $m^{th}$ slave devices 160_1 through 160_m may support communication at bandwidths different from the bandwidth of the host 120. Each of the first through $m^{th}$ slave devices 160_1 through 160_m may be assigned at least one slave address by the host 120 to communicate with the host 120. The host 120 includes a bus master 122 and the bus master 122 may control or manage an operation of assigning the slave addresses to the first through $m^{th}$ slave devices 160_1 through 160_m. The bus master 122 may be referred to as a bus controller. In an embodiment, the bus master 122 and the first through $m^{th}$ slave devices 160_1 through 160_m perform an address resolution protocol (ARP), so that the slave addresses are assigned to the first through $m^{th}$ slave devices 160_1 through 160_m.

In an embodiment, the first slave device 160_1 includes a plurality of ports 162 and a plurality of ARP endpoints 164 capable of supporting ARP. The ARP endpoints 164 may be referred to as management endpoints. The ports 162 include one ARP dedicated port P0 and ports P1 through Pk for communication. In addition, the first slave device 160_1 may further include a power management integrated circuit (not shown) and a temperature sensor (not shown), and the ports 162 may further include at least one port connected to the power management integrated circuit and the temperature sensor.

When the first slave device 160_1 performs the ARP, the first slave device 160_1 receives an ARP related message (e.g., a packet having an ARP format) from the bus master 122 by using the ARP dedicated port P0. In an embodiment, the first slave device 160_1 assigns an ARP address to the ARP dedicated port P0 to enable the first slave device 160_1 to receive the ARP related message. For example, when the first slave device 160_1 boots up, the first slave device 160_1 may read the ARP address stored in a non-volatile memory therein and assign the ARP address to the ARP dedicated port P0. The bus master 122 transmits to the first slave device 160_1 an ARP related message including an address matching the ARP address, and the first slave device 160_1 receives the ARP related message through the ARP dedicated port P0.

In an embodiment, the bus master 122 sends out an ARP request and the slave devices respond through their ARP dedicated ports with an ARP reply that indicates their respective ARP addresses. In this embodiment, upon the bus master 122 receiving an ARP reply associated with a given slave device, the bus master 122 sends out an ARP message with the ARP address of the given slave device so only the given slave devices processes the ARP message, and additional slave addresses so that the given slave device assigns them to its endpoints.

The first through $k^{th}$ ports P1 through Pk may correspond to the ARP endpoints 164, respectively. For example, the first port P1 may correspond to a first ARP endpoint ARP Endpoint_1, and the second port P2 may correspond to a second ARP endpoint ARP Endpoint_2. In this manner, the first through $k^{th}$ ports P1 through Pk may be in one-to-one correspondence to the ARP endpoints 164. However, this is only an example embodiment, and the first through $k^{th}$ ports P1 through Pk may correspond to the ARP endpoints 164 in various ways. The first slave device 160_1 performs the ARP based on the received ARP related message, and assigns the slave addresses received from the bus master 122 to the respective ARP endpoints 164. In addition, the first slave device 160_1 may assign the slave addresses to the first through $k^{th}$ ports P1 through Pk corresponding to the respective ARP endpoints 164 based on a result of the assignment. For example, the first slave device 160_1 may assign the first slave address received from the bus master 122 to the first ARP endpoint, and may assign the first slave address to the first port P1 corresponding to the first ARP endpoint. A detailed description of ARP performance of the first slave device 160_1 will be described below.

The ARP endpoints 164 may receive commands, requests, and/or data signals from the host 120 via corresponding ports P1 through Pk. The ARP endpoints 164 may route the received signals to a controller or a processor in the first slave device 160_1. In addition, the ARP endpoints 164 may transmit to the host 120 responses and/or data signals generated by the controller or the processor in the first slave device 160_1 via the corresponding ports P1 through Pk.

A configuration of the first slave device 160_1 may be applied to the other slave devices 160_2 through 160_m. However, the ARP addresses of the first through $m^{th}$ slave devices 160_1 through 160_m may be different from each other, and the number of ports and the number of ARP endpoints included in each of the first through $m^{th}$ slave devices 160_1 through 160_m may be the same or different from each other. Each of the first through $m^{th}$ slave devices 160_1 through 160_m receive the ARP related message from the bus master 122 via the ARP dedicated port, perform the ARP based on the ARP related message, and are assigned the slave addresses.

In an embodiment, all the ports (162) of a given slave device (e.g., 160_1) are deactivated initially. In this embodiment, only one of the ports (e.g., P0) is activated and assigned an ARP address so it can receive the ARP request (e.g., first received packet) and send the ARP reply. Then, the host 120 can send a second packet including the ARP address and a plurality of slave addresses, in response to the ARP reply. The slave device then receives the second packet through its dedicated ARP port, activates the remaining ports (e.g., P1-Pk), and assigns the slave addresses to the endpoints.

As described above, a slave device according to an embodiment of the inventive concept receives an ARP related message from a host to assign a slave address to each of its ARP endpoints via its ARP dedicated port dedicated to the ARP related message. A size of the slave device may be reduced by decreasing the number of ports needed for performing the ARP.

Figure 2A:
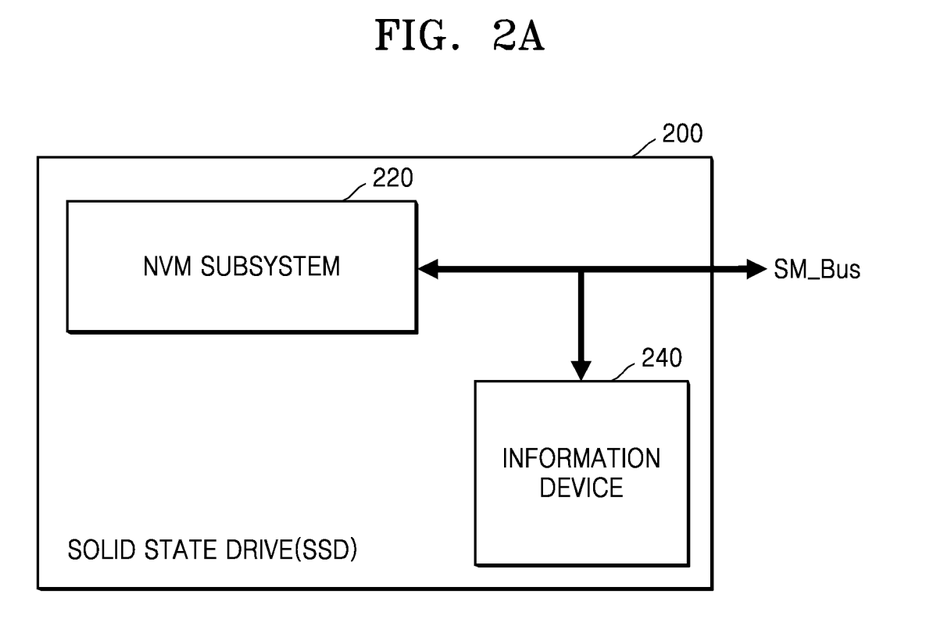
FIGS. 2A and 2B are block diagrams illustrating implementation examples of a first slave device of FIG. 1.
Figure 2B:
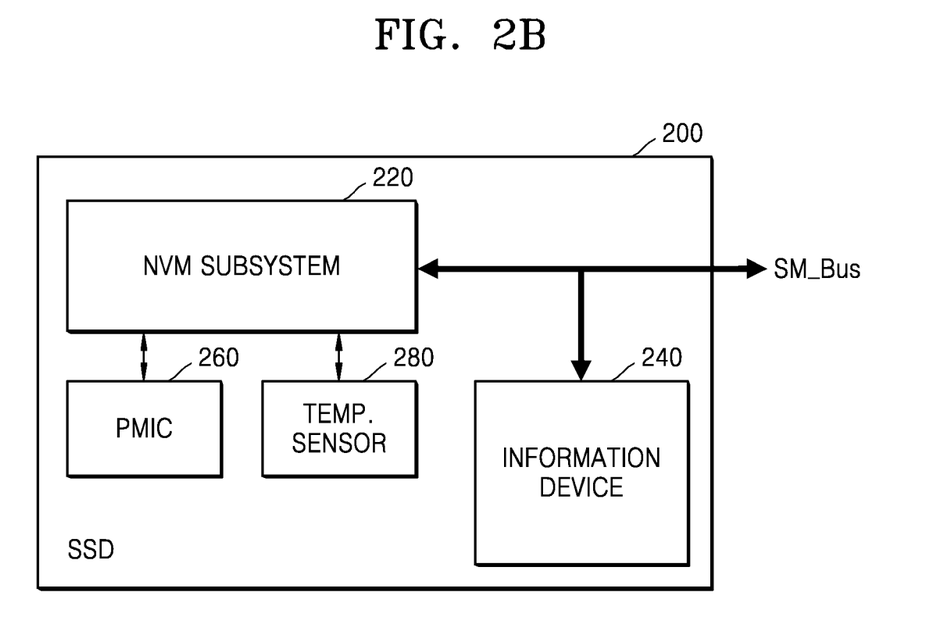

FIGS. 2A and 2B are block diagrams illustrating implementation examples of the first slave device 160_1 in FIG. 1.

Referring to FIG. 2A, the first slave device 160_1 in FIG. 1 is implemented as a solid state drive (SSD) 200. However, this is only an example embodiment, and the first slave device 160_1 may be implemented by various kinds of memory systems or memory devices. Hereinafter, the first slave device 160_1 will be described based on an example in which the first slave device 160_1 is implemented as the SSD 200. The SSD 200 includes a nonvolatile memory (NVM) subsystem 220 for performing a memory operation and an information device 240 for storing vital product data (VPD). The VPD may be defined by an intelligent platform management interface (IPMI) platform management field replaceable unit (FRU) information store definition, and may include configuration information and information data related to a particular hardware or software set of the SSD 200. For example, the VPD may store information such as a part number, a serial number, and an engineering change level associated with the SSD 200. The information device 240 may be referred to as a FRU information device. In an embodiment, the information device 240 is implemented by an electrically erasable programmable read-only memory (EEPROM) device. The NVM subsystem 220 may include at least one controller (or processor) and nonvolatile memories.

The NVM subsystem 220 and the information device 240 are connected to the SM bus SM_Bus. In other words, the host 120 in FIG. 1 may access the NVM subsystem 220 and the information device 240 via the SM bus SM_Bus. The NVM subsystem 220 may receive a request or a command (hereinafter, will be uniformly described as the command for convenience of description) from the host 120 via the SM bus SM_Bus, and may perform the memory operation in response to the command. The NVM subsystem 220 may transmit the result of the memory operation (e.g., a read operation, a write operation, etc.) to the host 120 via the SM bus SM_Bus. The information device 240 may receive a VPD related command from the host 120 via the SM bus SM_Bus, and the information device 240 may transmit a response to the VPD related command from the host 120 via the SM bus SM_Bus.

The ARP endpoints 164 in FIG. 1 may include at least one ARP endpoint corresponding to the NVM subsystem 220, and at least one ARP endpoint corresponding to the information device 240. While the SSD 200 of FIG. 2A and FIG. 2B illustrate the NVM subsystem 220 and the information device 240 as separate blocks, the inventive concept is not limited thereto. For example, the NVM subsystem 220 and the information device 240 could be implemented as a single block.

Referring to FIG. 2B, the SSD 200 may further include a power management integrated circuit (PMIC) 260 and a temperature sensor 280, as compared with the SSD 200 of FIG. 2A. The PMIC 260 may manage power of the SSD 200, and the temperature sensor 280 may sense temperature inside the SSD 200. A controller in the NVM subsystem 220 may control an operation of the PMIC 260 and an operation of the temperature sensor 280.

Figure 3:
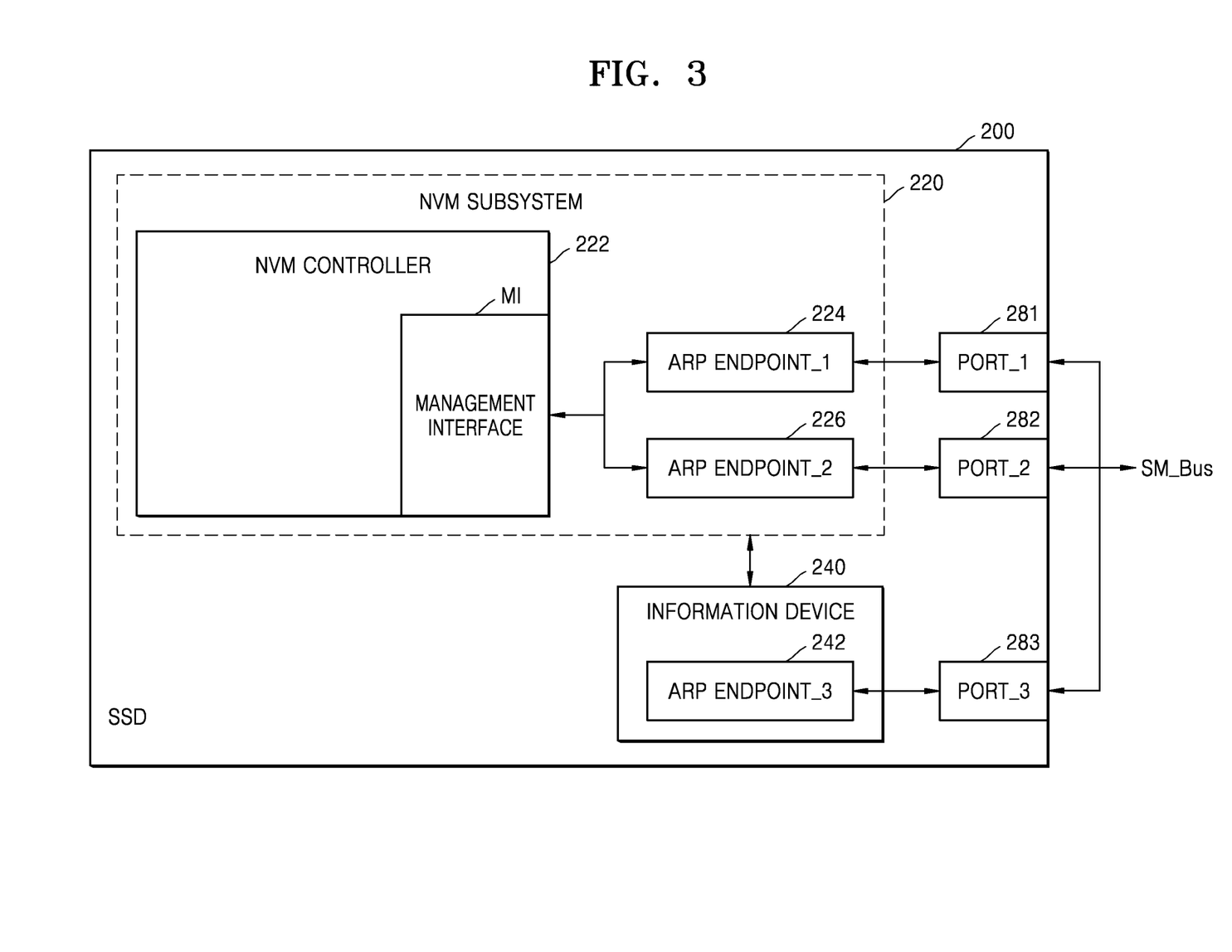
FIG. 3 is a block diagram illustrating a configuration of address resolution protocol (ARP) endpoints and ports of a solid state drive (SSD) according to an exemplary embodiment of the inventive concept.

FIG. 3 is a block diagram illustrating a configuration of a first through third ARP endpoints 224, 226, 242 and a first through third ports 281, 282, 283 of the SSD 200 according to an exemplary embodiment of the inventive concept.

Referring to FIG. 3, the SSD 200 includes the NVM subsystem 220, the information device 240, and the first through third ports 281 through 283. The NVM subsystem 220 includes a NVM controller 222 (e.g., a control circuit), and the first to second ARP endpoints 224 and 226 corresponding to the NVM controller 222. The first ARP endpoint 224 corresponds to the first port 281 and is connected to the SM bus SM_Bus via the first port 281. The second ARP endpoint 226 corresponds to the second port 282 and is connected to the SM bus SM_Bus via the second port 282. The first and second ARP endpoints 224 and 226 receive commands from the host 120 in FIG. 1 via the SM bus SM_Bus and route the received commands to the NVM controller 222. For example, after the ARP endpoints 224 and 226 have been assigned the slave addresses, they are able to receive the commands. The NVM controller 222 includes a management interface MI, and the management interface MI processes commands routed from the first and second ARP endpoints 224 and 226 on behalf of the first and second ARP endpoints 224 and 226, respectively. In other words, the management interface MI may perform the memory operation based on the routed commands. In an embodiment, the management interface MI is implemented by a processor. The management interface MI transmits results of the memory operation to the first and second ARP endpoints 224 and 226, and the first and second ARP endpoints 224 and 226 transmit the result of the memory operation to the host 120 via the first and second ARP ports 281 and 282, respectively. Although the NVM subsystem 220 in FIG. 3 is illustrated as including only one NVM controller 222, this is only an example embodiment. The embodiment of the NVM subsystem is not limited thereto and may include a plurality of NVM controllers to support various functions.

The information device 240 may store the VPD, as described with reference to FIG. 2A, and the third endpoint 242 may correspond to the information device 240. The third ARP endpoint 242 corresponds to the third port 283 and is connected to the SM bus SM_Bus via the third port 283. The third ARP endpoint 242 receives the VPD related command from the host 120 via the SM bus SM_Bus and routes the received VPD related command to the NVM controller 222. Operations relating to the VPD related commands will be described in detail with reference to FIGS. 10 and 11.

As described above, the first, second, and third ARP endpoints 224, 226, and 242 need to be assigned the slave addresses to receive commands from the host 120 via the SM bus SM_Bus, or transmit responses to the commands to the host 120. The SSD 200 may perform the ARP to assign the slave addresses to the first, second, and third ARP endpoints 224, 226, and 242 as described above, and this feature will be described in detail with reference to FIG. 4 and the like.

In addition, the configuration of the SSD 200 illustrated in FIG. 3 is only an example embodiment, and the embodiment is not limited thereto. The SSD 200 may include various devices other than the NVM subsystem 220 and the information device 240, and various endpoints may be formed in the SSD 200 according to the configuration of the SSD 200.

Figure 4:
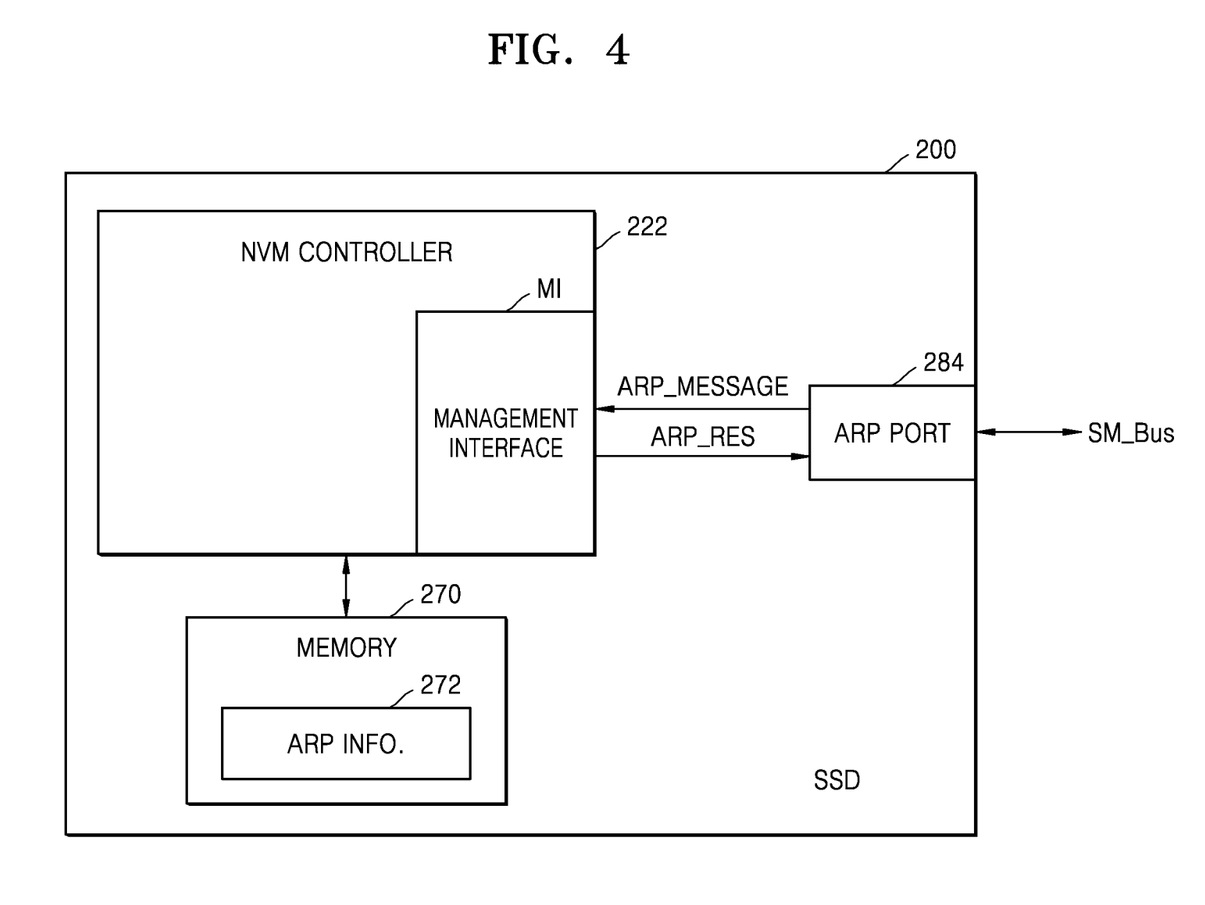
FIG. 4 is a block diagram illustrating ARP performance of the SSD according to an exemplary embodiment of the inventive concept.

FIG. 4 is a block diagram illustrating the ARP performance of the SSD 200 according to an exemplary embodiment of the inventive concept.

FIG. 4 shows only components necessary for explaining the ARP performance of the SSD 200. Referring to FIG. 4, the SSD 200 includes the NVM controller 222, a memory 270 and an ARP dedicated port 284. The NVM controller 222 includes the management interface MI for the ARP performance. The memory 270 may be the NVM, and when the management interface MI performs the ARP, the memory 270 may store ARP information 272. The ARP information 272 may include certain commands and/or ARP addresses that are needed for the management interface MI to perform the ARP according to embodiments of the inventive concept. In an embodiment, the ARP dedicated port 284 exclusively receives the ARP related message ARP_Message from the host 120 in FIG. 1 via the SM bus SM_Bus, and provides it to the management interface MI. The ARP dedicated port 284 receives an ARP response ARP_Res in response to the ARP related message ARP_Message from the management interface MI, and transmits it to the host 120 via the SM bus SM_Bus.

In an embodiment, the management interface MI reads the ARP information 272 from the memory 270 after the SSD 200 boots up, and obtains the ARP address from the ARP information 272 and assigns the ARP address to the ARP dedicated port 284. In addition, the management interface MI may activate the ARP dedicated port 284, and the ARP dedicated port 284 may receive the ARP related message ARP_Message corresponding to the assigned ARP address and provide the ARP related message ARP_Message to the management interface MI. In an embodiment, the ARP dedicated port 284 does not exchange messages unless it is activated. The ARP message ARP_Message may include various types of ARP commands, and the management interface MI may perform different operations depending on the types of the ARP commands. Details of this feature will be described later with reference to FIG. 7. In summary, the management interface MI may assign the slave address received from the host 120 to each of the first, second, and third ARP endpoints 224, 226, and 242 in FIG. 3 based on the ARP message ARP_Message, and further assign the slave address to each of the first, second, and third ports 281, 282, and 283.

The management interface MI according to an embodiment receives the ARP related message ARP_Message via one ARP dedicated port 284 and may efficiently perform the ARP by performing en bloc the assignment of the slave addresses to the first, second, and third ARP endpoints 224, 226, and 242, respectively. In an embodiment, the management interface MI is configured to assign the ARP endpoints (e.g., 224, 226, and 242) their slave addresses simultaneously or in parallel.

Figure 5:
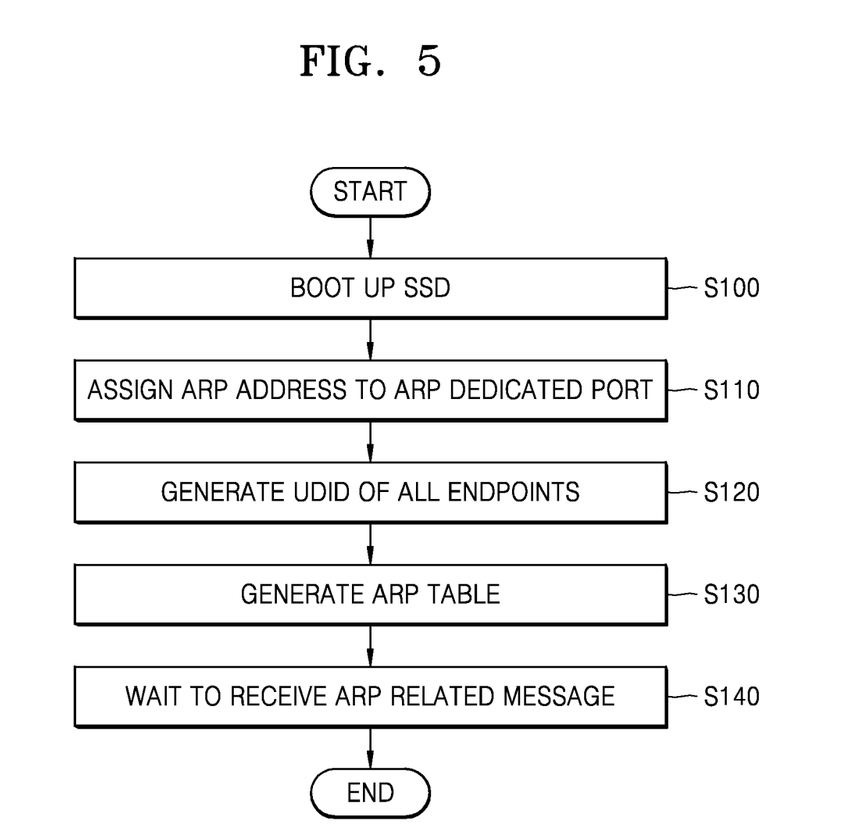
FIG. 5 is a flowchart for explaining operations until an ARP related message of the SSD of FIG. 4 is received.
Figure 6:
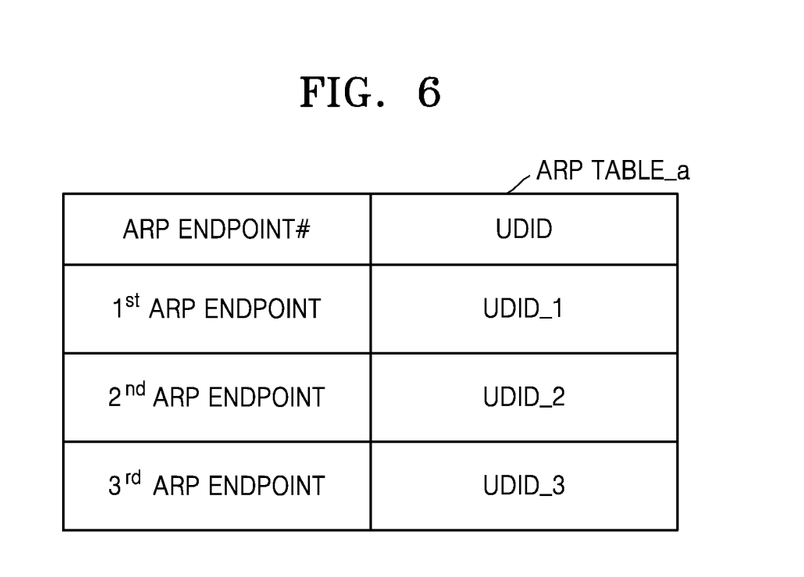
FIG. 6 is a diagram illustrating an ARP table generated for the ARP performance in the SSD of FIG. 4.

FIG. 5 is a flowchart for explaining operations until the ARP related message of the SSD 200 of FIG. 4 has been received, and FIG. 6 is a diagram illustrating an ARP table generated for the ARP performance in the SSD 200 of FIG. 4. Hereinafter, contents in FIGS. 5 and 6 will be described based on contents in FIGS. 3 and 4.

Referring to FIG. 5, the SSD 200 boots up (S100). For example, the SSD may boot up when power is turned on after the power has been turned off or when the SSD 200 is reset. Thereafter, the management interface MI assigns the ARP address to the ARP dedicated port 284 (S110). The management interface MI generates unique device identifiers (UDIDs) for the first, second, and third ARP endpoints 224, 226, and 242 (S120). The UDIDs of the first, second, and third ARP endpoints 224, 226, 242 may be different from each other and may be used when the slave addresses are assigned to the first, second, and third ARP endpoints 224, 226, 242. In addition, the management interface MI generates an ARP table based on the generated UDIDs (S130).

Further referring to FIG. 6, the management interface MI generates an ARP table ARP Table_a based on the generated UDIDs to manage the UDIDs. The ARP table ARP Table_a may represent a correspondence relationship between the first, second, and third ARP endpoints 224, 226, and 242 and the generated UDIDs. For example, in the ARP table ARP Table_a, the first ARP endpoint 224 corresponds to a first UDID UDID_1, the second ARP endpoint 226 corresponds to a second UDID UDID_2, and the third ARP endpoint 242 corresponds to a third UDID UDID_3. As described above, the management interface MI may collectively generate the first through third UDIDs UDID_1 through UDID_3 for all of the first, second, and third ARP endpoints 224, 226, and 242 in the SSD 200, and may manage the first through third UDIDs UDID_1 through UDID_3 by using the ARP table ARP Table_a.

Referring back to FIG. 5, the management interface MI waits to receive the ARP related message to perform the ARP (S140).

Figure 7:
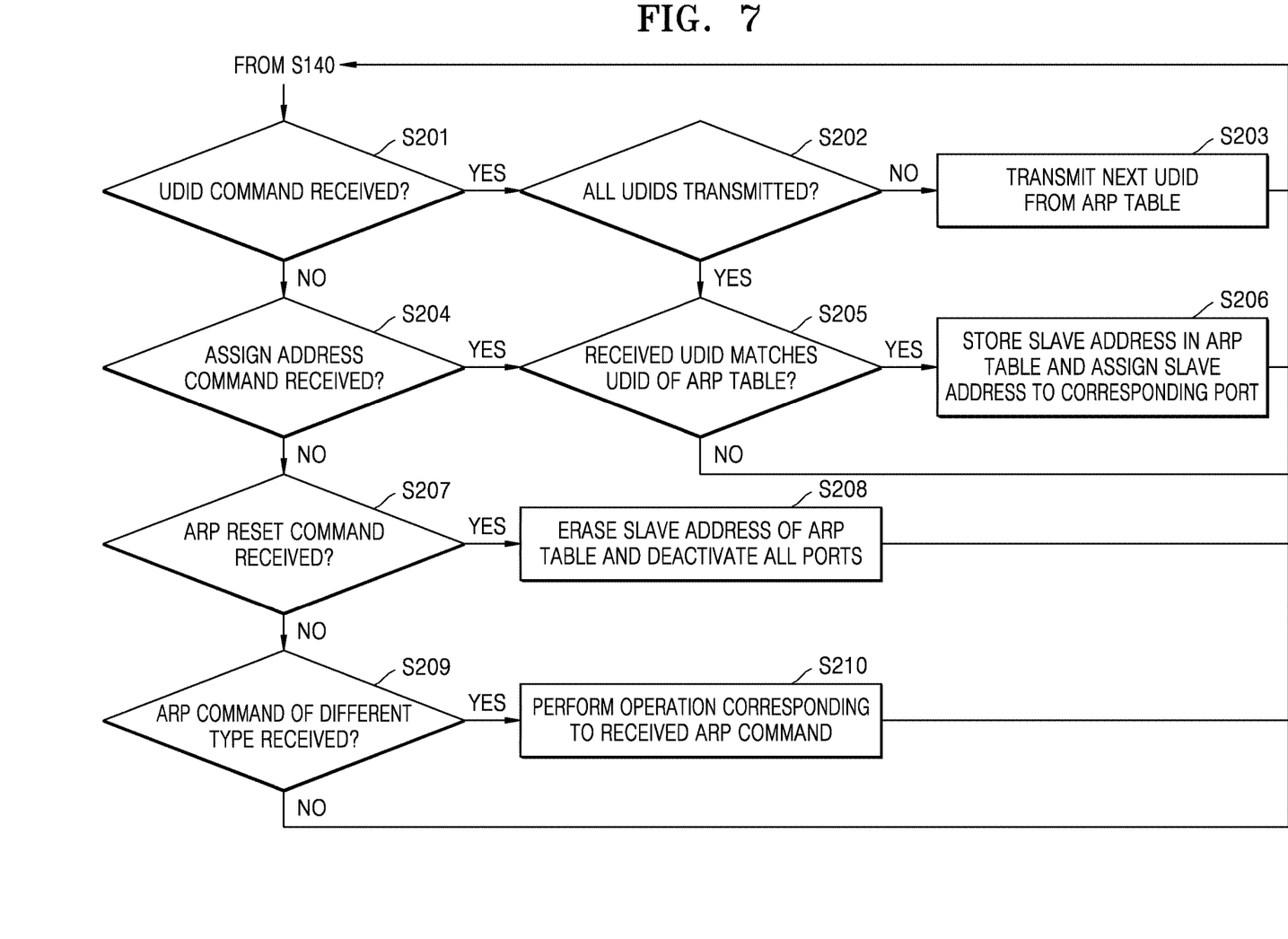
FIG. 7 is a flowchart for explaining operations when an ARP-related message of the SSD of FIG. 4 is received.
Figure 8:
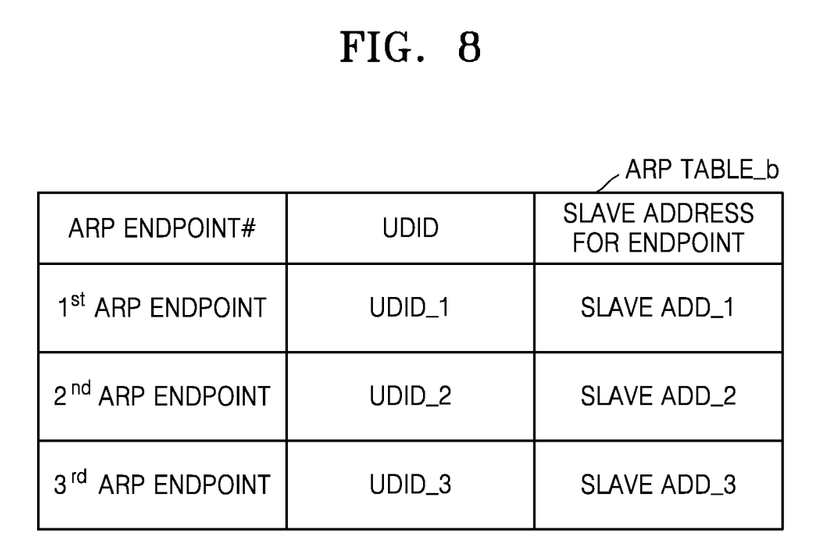
FIG. 8 is a diagram illustrating the ARP table generated as a result of the ARP performance in the SSD of FIG. 4.

FIG. 7 is a flowchart for explaining an operation when the ARP related message of the SSD 200 of FIG. 4 has been received, and FIG. 8 is a diagram illustrating an ARP table ARP Table_b generated as a result of the ARP performance in the SSD 200 of FIG. 4. Hereinafter, contents of FIGS. 7 and 8 will be described based on the contents of FIGS. 3 and 4.

Referring to FIG. 7, after step S140 in FIG. 5, the management interface MI determines whether a GetUDID command has been received (S201). In an embodiment, the host 120 sends a packet including the ARP address and the GetUDID command to request the UDIDs of all the available endpoints of slave device corresponding to the ARP address. The management interface MI may determine whether the ARP command included in the received ARP related message ARP_Message is the GetUDID command. When the GetUDID command has been received (YES in S201), the management interface MI determines whether all of the first through third UDIDs UDID_1 through UDID_3 have been transmitted via the SM bus SM_Bus (S202). For example, in response to the GetUDID command, the slave device outputs its UDIDs to the host 120. When all of the first through third UDIDs UDID_1 through UDID_3 have not been transmitted (NO in S202), the management interface MI transmits the UDID that has not been transmitted to the host 120 from the ARP table ARP Table_a (S203). When all of the first through third UDIDs UDID_1 through UDID_3 have been transmitted (YES in S202), the management interface MI does not further respond to the host 120, but waits to receive a next ARP related message ARP_Message (S140).

When the GetUDID command has not been received (NO in S204), the management interface MI determines whether an Assign Address command has been received (S204). For example, after the host 120 has received all the UDIDs, it sends an Assign Address command with one of the UDIDs and a slave address. The management interface MI may determine whether the ARP command included in the received ARP related message ARP_Message is the Assign Address command. When the Assign Address command has been received (YES in S204), the management interface MI determines whether any UDID among the first through third UDIDs UDID_1 through UDID_3 of the ARP table ARP Table_a matches the UDID included in the ARP related message ARP_Message (S205). When there is one UDID that matches the UDID included in the ARP related message ARP_Message among the first through third UDIDs UDID_1 through UDID_3 of the ARP table ARP Table_a (YES in S205), the management interface MI (ARP_Message) stores the slave address included in the ARP related message and assigns the slave address to the port corresponding to the matching UDID (S206). In addition, the management interface MI may transmit a certain acknowledge signal to the host 120, so that the host 120 transmits the ARP related message including another UDID, the slave address, and the Assign Address command. For example, if the host 120 sends an Assign Address command along with the first UDID_1 and a corresponding first slave address Slave ADD_1, upon receiving the acknowledge signal, the host 120 sends the Assign Address command along with the second UDID_2 and a second corresponding slave address Slave ADD_2.

Further referring to FIG. 8, when the ARP message ARP_Message includes the Assign Address command, the first UDID UDID_1, and the first slave address Slave ADD_1, the management interface MI identifies the first UDID UDID_1 of the first ARP endpoint 224 matches the first UDID UDID_1 of the ARP table ARP Table_b. The management interface MI assigns the first slave address Slave ADD_1 to the first ARP endpoint 224 by storing the first slave address Slave ADD_1 in an area of the ARP table ARP Table_b corresponding to the first ARP endpoint 224. In addition, the management interface MI may assign the first slave address Slave ADD_1 to the first port 281 corresponding to the first ARP endpoint 224. The management interface MI may execute a loop including step S205 multiple times to assign the first to third slave addresses Slave ADD_1 through Slave ADD_3 to the first, second, and third endpoints 224, 226, and 242, respectively. The management interface MI may store the first through third slave addresses Slave ADD_1 to Slave ADD_3 in the ARP table ARP Table_b, and manage en bloc the first through third slave addresses Slave ADD_1 through Slave ADD_3 by using the ARP table ART Table_b.

Referring back to FIG. 7, when there is no more UDID that matches the UDID included in the ARP related message ARP_Message among the first through third UDIDs UDID_1 through UDID_3 of the ARP table ARP Table_a, the management interface MI does not respond to the host 120 and instead, waits to receive the next ARP message (S140).

When the Assign Address command has not been received (NO in S204), the management interface MI determines whether the ARP Reset command has been received (S207). The host 120 may send the ARP Reset command when it wants to assign the slave addresses to a different slave device. The management interface MI may determine whether the ARP command included in the received ARP related message ARP_Message is the ARP Reset command. When the ARP Reset command has been received (YES in S207), the management interface MI removes the assignment of the slave address to the first, second, and third endpoints 224, 226, and 242, by erasing the first through third slave addresses Slave ADD_1 through Slave ADD_3 of the ARP table ARP Table_b, and deactivates the first through third ports 281 through 283 (S208). Thereafter, the management interface MI waits to receive the next ARP related message ARP_Message (S140).

When the ARP Reset command has not been received (NO in S207), the management interface MI determines whether a command of a different type has been received (S209). For example, one of commands of different types may be Prepare to ARP. The management interface MI may determine whether the ARP command included in the received ARP related message ARP_Message is a command of a different type. When another type of the command is received (YES in S209), the management interface MI performs an operation corresponding to the received ARP command (S210). When another type of a command has not been received (NO in S209), the management interface MI waits to receive the next ARP related message ARP_Message (S140).

A sequence, illustrated in FIG. 7, of determining whether an ARP command is received, is only an example embodiment, and thus, the inventive concept is not limited thereto. It may be possible to determine whether an ARP command is received based on various sequences.

Figure 9:
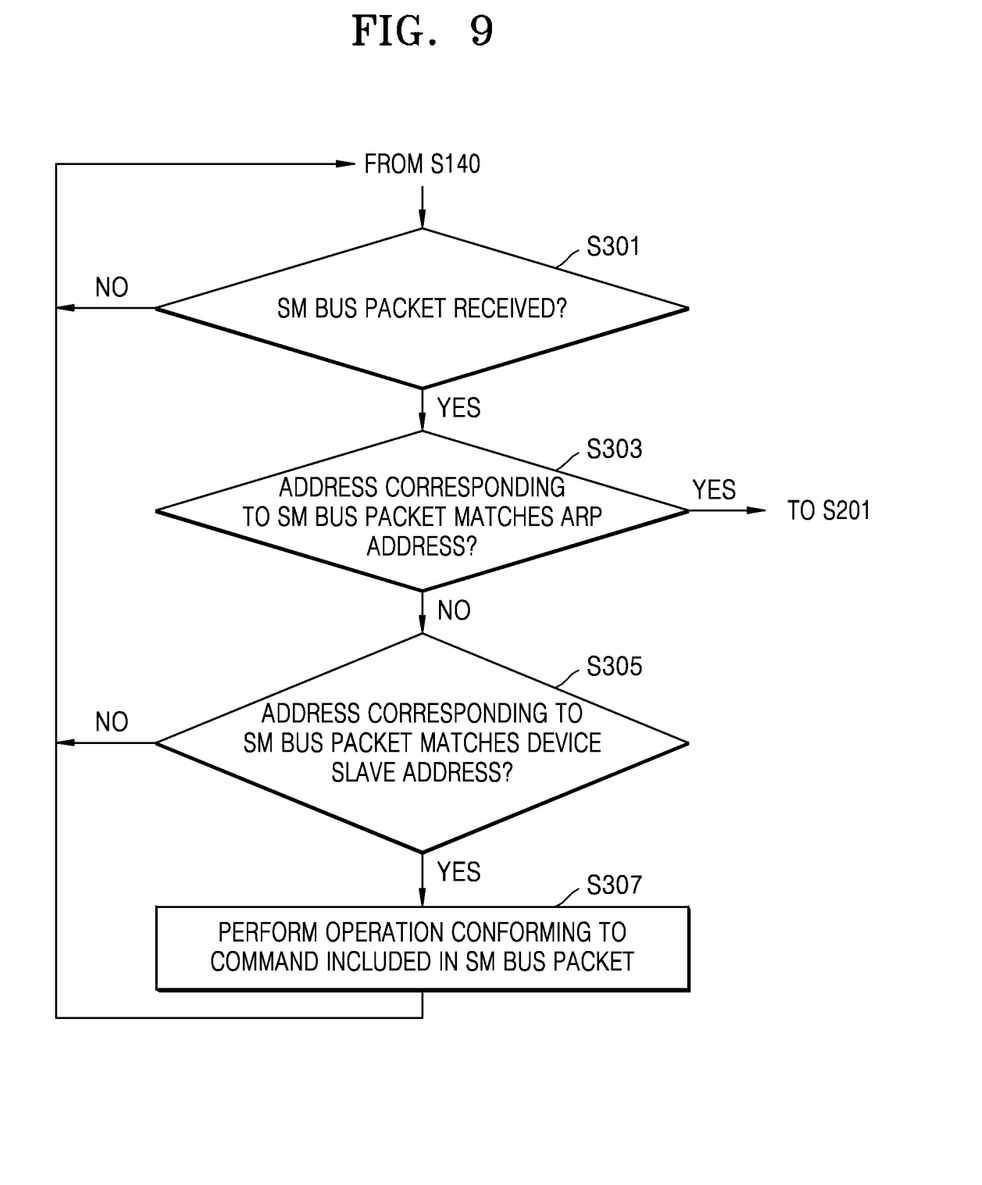
FIG. 9 is a flowchart for explaining operations of the SSD after operation S140 in FIG. 5 according to an exemplary embodiment of the inventive concept.

FIG. 9 is a flowchart for explaining operations of the SSD after step S140 in FIG. 5 according to an exemplary embodiment of the inventive concept. Hereinafter, contents of FIG. 9 will be described based on the contents of FIGS. 3 and 4.

Referring to FIG. 9, the management interface MI determines whether it has received a SM bus packet (or an SM bus packet including an address) together with the address from the host 120 in FIG. 1 via the SM bus SM_Bus after step S140 (S301). The SM bus packet includes the ARP related message ARP_Message. If the SM bus packet has been received, the management interface MI determines whether the address corresponding to the SM bus packet matches the ARP address assigned to the ARP dedicated port 284 (S303). When the address corresponding to the SM bus packet matches the ARP address (YES in S303), the management interface MI performs step S201 in FIG. 7 by using the ARP related message ARP_Message included in the SM bus packet. When the address corresponding to the SM bus packet does not match the ARP address (NO in S303), the management interface MI determines whether the address corresponding to the SM bus packet matches a device slave address of the SSD 200 (S305). The device slave address may refer to the slave address assigned to each of the first, second, and third ARP endpoints 224, 226, and 242. Illustratively, further referring to FIG. 8, when the address corresponding to the SM bus packet is the first slave address Slave ADD_1, the management interface MI determines that the address corresponding to the SM bus packet matches the first slave address Slave ADD_1 assigned to the first endpoint 224, by referring to the ARP table ARP Table_b.

When the address corresponding to the SM bus packet matches the device slave address of the SSD 200 (YES in S305), the management interface MI performs an operation corresponding to the command included in the SM bus packet. In other words, when the address corresponding to the SM bus packet is the first slave address Slave ADD_1, the first ARP endpoint 224 receives the SM bus packet via the first port 281, and the first ARP endpoint 224 routes the SM bus packet to the management interface MI. The management interface (MI) can perform operations conforming to the commands included in the SM bus packet. Further, the management interface MI may provide the first ARP endpoint 224 with a result of performing the operation according to the command, and the first ARP endpoint 224 may transmit the result of performing the operation according to the command via the first port 281.

When the SM bus packet has not been received (NO in S301), or when the address corresponding to the SM bus packet does not match the device slave address (NO in S305), the management interface MI waits to receive a next SM bus packet including the ARP related message ARP_Message after step S307 is performed (S140).

Figure 10:
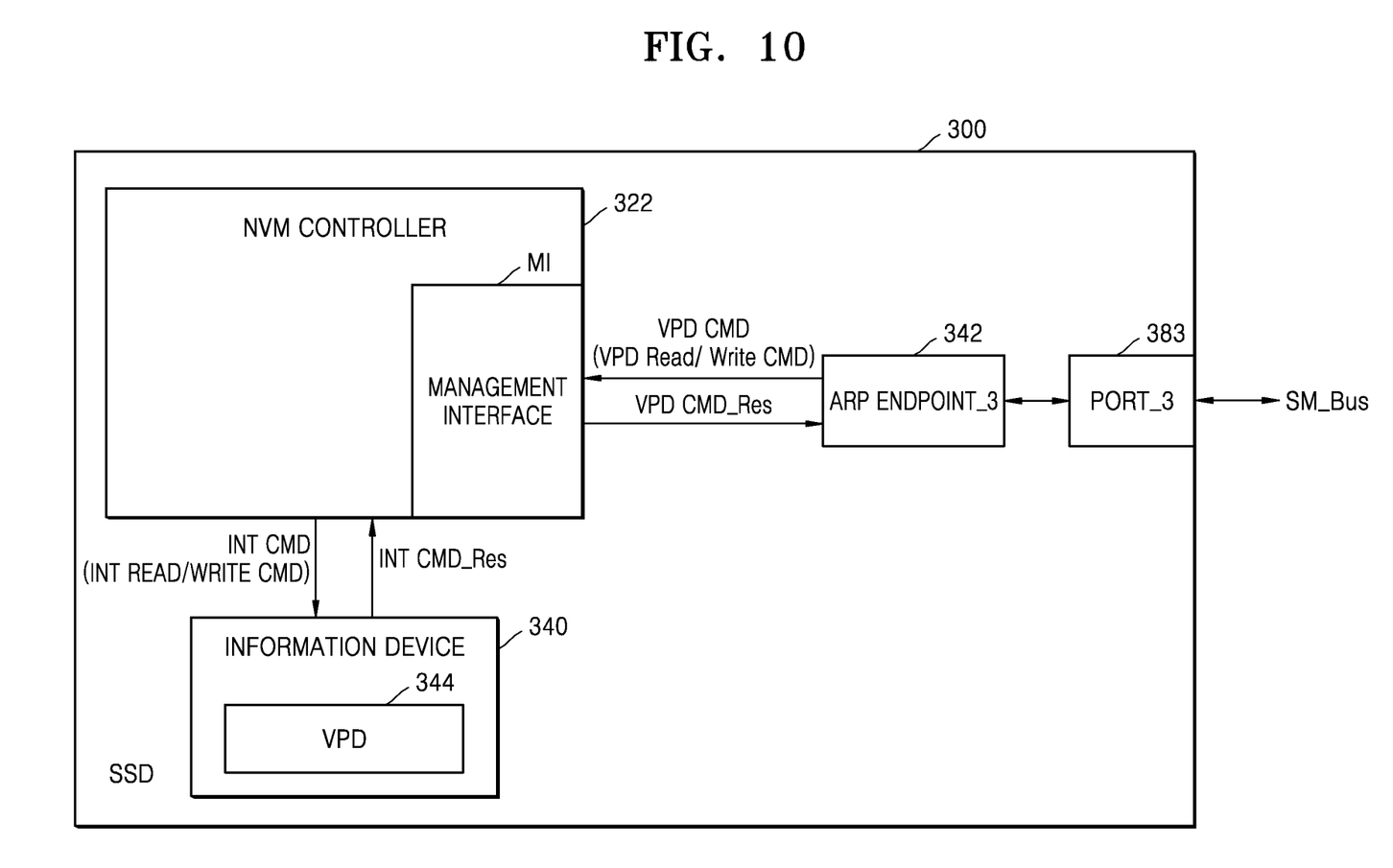
FIG. 10 is a block diagram illustrating an operation performed according to a vital product data (VPD) related command of the SSD according to an exemplary embodiment of the inventive concept.
Figure 11:
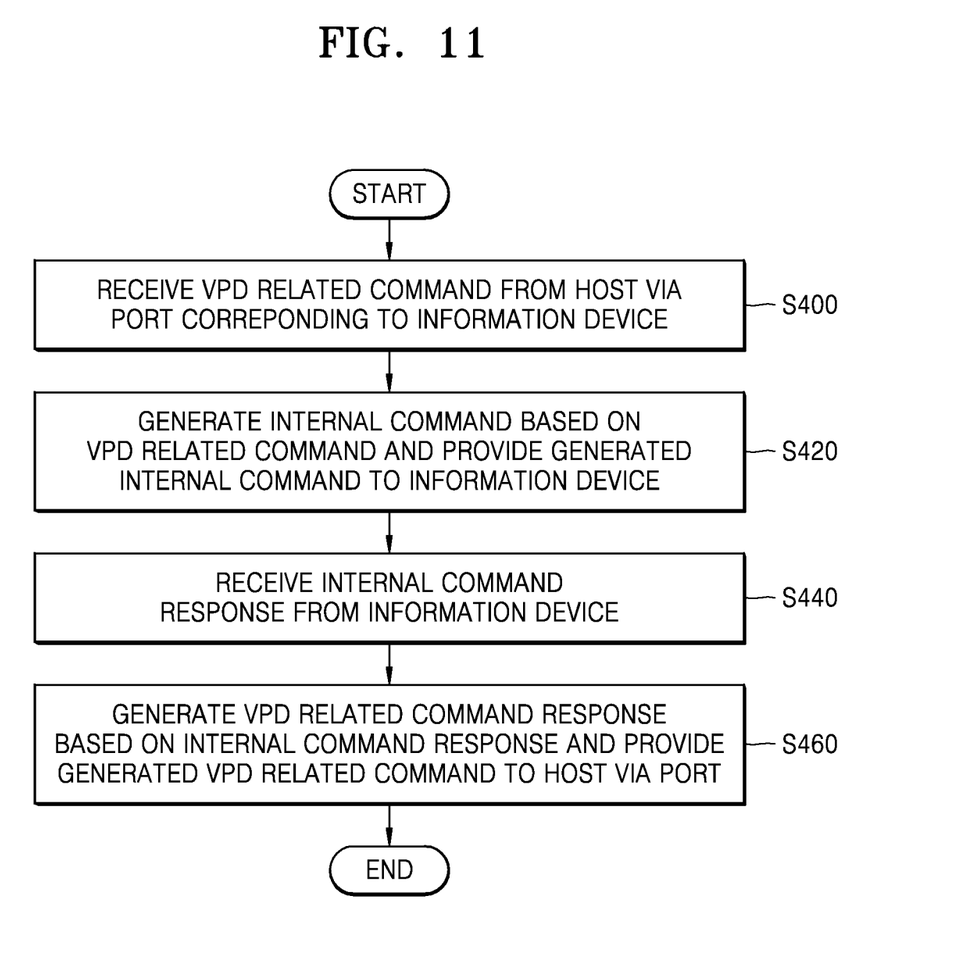
FIG. 11 is a flowchart for explaining operations of the SSD of FIG. 10.

FIG. 10 is a block diagram illustrating an operation performed according to the VPD related command of the SSD 200 according to an exemplary embodiment of the inventive concept, and FIG. 11 is a flowchart for explaining operations of the SSD 200 of FIG. 10.

In FIG. 10, only the components necessary for explaining operation performance conforming to the VPD related command of a SSD 300 are discussed. Referring to FIG. 10, the SSD 300 includes a controller 322, an information device 340, a third ARP endpoint 342, and a third port 383. The third ARP endpoint 342 may be in a state where the slave address has been assigned and the third ARP endpoint 342 may receive the VPD related command VPD CMD from the host 120 in FIG. 1 via the third port 383. The VPD related command VPD CMD may be a VPD read command VPD Read CMD or a VPD write command VPD Write CMD. The host 120 may access a VPD 344 stored in an information device 340 or may transmit VPD related commands to the SSD 300 via the SM bus SM_Bus to update the VPD 344. The VPD 344 is data that is stored in a memory of the information device 340.

Firstly, when the third ARP endpoint 342 receives the VPD read command VPD Read CMD, the VPD read command VPD Read CMD is routed to the management interface MI. The management interface MI generates an internal read command INT Read CMD based on the VPD read command VPD Read CMD, and provides the generated internal read command INT Read CMD to the information device 340. The management interface MI receives an internal command response INT CMD_Res including the VPD 344 from the information device 340. The management interface MI generates the VPD command response VPD CMD_Res including the VPD 344 based on the internal command response INT CMD_Res, and provides the VPD command response VPD CMD_Res to the third ARP endpoint 342. The ARP endpoint 342 transmits the VPD command response VPD CMD_Res to the host 120 via the third port 383.

When the third ARP endpoint 342 receives the VPD write command VPD Write CMD through the third port 383, a certain data may be received from the host 120 together with the VPD write command VPD Write CMD. The third ARP endpoint 342 routes the certain data and the VPD write command VPD Write CMD to the management interface MI. The management interface MI generates the internal write command INT Write CMD based on the VPD write command VPD Write CMD and provides the generated internal write command INT Write CMD to the information device 340 together with the certain data. The information device 340 writes the certain data in the memory of the information device 340 as the VPD 344, in response to the internal write command INT Write CMD. The management interface MI may receive the internal command response INT CMD_Res that includes at least one of a signal for notifying a completion of the write operation from the information device 340 and a signal for notifying reception of the internal write command INT Write CMD. The management interface MI generates the VPD command response VPD CMD_Res based on the internal command response INT CMD_Res and provides the generated VPD command response VPD CMD_Res to the third ARP endpoint 342. The third ARP endpoint 342 transmits the VPD command response VPD CMD_Res to the host 120 via the third port 383. In an embodiment, if the memory interface MI does not receive the signal notifying of the reception of the internal write command INT Write CMD within a certain time period, the memory interface MI resends the internal write command INT Write CMD to the information device 340.

Referring to FIG. 11, the management interface MI receives the VPD related command from the host 120 via a port corresponding to the information device 340 (for example, the third port 383) (S400). The management interface MI generates the internal command INT CMD based on the VPD related command and provides the generated internal command INT CMD to the information device 340 (S420). The management interface MI receives the internal command response INT CMD_Res from the information device 340 (S440). For example, the information device 340 sends the internal command response INT CMD_Res to the management interface MI in response to receipt of the internal command INT CMD. The management interface MI generates the VPD related command response VPD CMD_Res based on the internal command response INT CMD_Res and provides the generated VPD related command response VPD CMD_Res to the host 120 via a port (for example, the third port 383) (S460).

Figure 12:
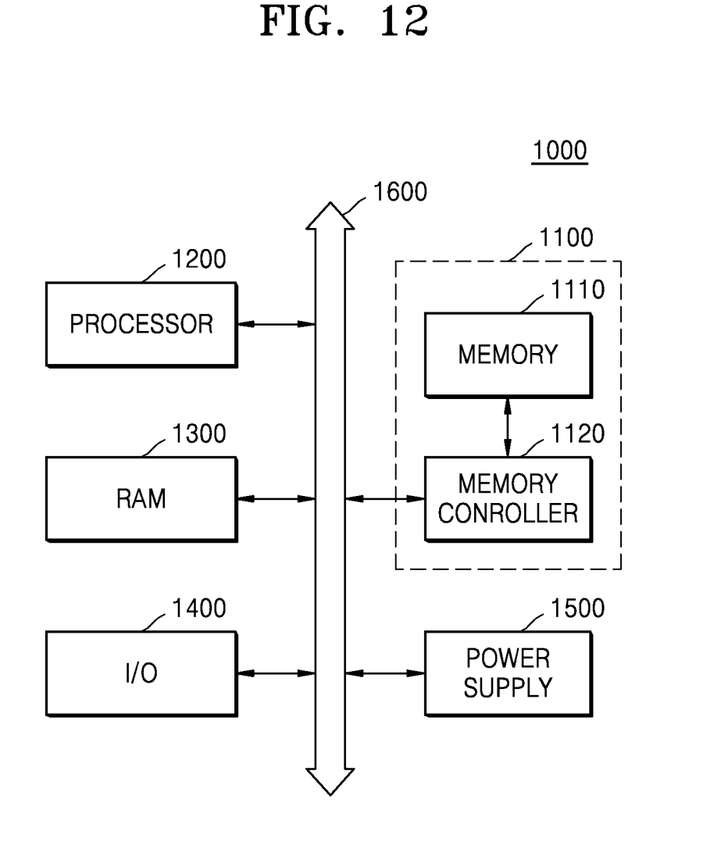
FIG. 12 is a schematic block diagram illustrating a computing system including a memory system according to exemplary embodiment of the inventive concept.

FIG. 12 is a schematic block diagram illustrating a computing system 1000 including a memory system 1100 according to an exemplary embodiment of the inventive concept.

Referring to FIG. 12, the computing system 1000 includes the memory system 1100, a processor 1200, a RAM 1300, an input/output (I/O) device 1400, and a power supply 1500.

In addition, although not illustrated in FIG. 12, the computing system 1000 may further include ports capable of communicating with video cards, sound cards, memory cards, USB devices, or other electronic devices. The computing system 1000 may be implemented by a personal computer or a portable electronic device such as a notebook computer, a mobile phone, a personal digital assistant (PDA), and a camera. The processor 1200 may perform particular calculations or tasks.

According to an exemplary embodiment, the processor 1200 is a micro-processor, or a central processing unit (CPU). The processor 1200 may perform communication with the RAM 1300, the I/O device 1400, and the memory system 1100 via a bus 1600 such as an address bus, a control bus, and a data bus. In this case, the memory system 1100 may be implemented such that the embodiments illustrated in FIGS. 1 through 11 are applied. In other words, the memory controller 1120 of the memory system 1100 may perform en bloc the ARP by using the ARP dedicated port to assign the slave addresses to respective endpoints corresponding to a memory 1110, and may efficiently perform the ARP by using the ARP table. A memory operation may be performed by changing a method thereof, depending on a position of a sub-block connected to at least one selected word line that is a target of the memory operation. According to an embodiment, the processor 1200 is also be connected to an expansion bus such as a peripheral component interconnect (PCI) bus. The RAM 1300 may store data necessary for an operation of the computing system 1000. For example, the RAM 1300 may be implemented by a dynamic random-access memory (DRAM), a mobile DRAM, a static RAM (SRAM), a phase-change RAM (PRAM), a ferroelectric RAM (FRAM), a resistive RAM (RRAM), and/or magnetoresistive RAM (MRAM). The I/O device 1400 may include input devices such as a keyboard, a keypad, and a mouse, and output devices such as a printer, and a display. The power supply 1500 may supply an operating voltage required for an operation of the computing system 1000.

While the inventive concept has been particularly shown and described with reference to exemplary embodiments thereof, it will be understood by those of ordinary skill in the art that various changes in form and details may be made therein without departing from the spirit and scope of the inventive concept.

What is claimed is:

1. A slave device comprising:
   a first port;
   a plurality of second ports and corresponding endpoints; and
   a controller configured to assign an address resolution protocol (ARP) address to only the first port to enable the controller to receive first commands including the ARP address through only the first port from a host, assign slave addresses to the endpoints based on the first commands to enable the second ports to communicate with the host, receive a second command including one of the slave addresses through a corresponding one of the second ports, perform an operation based on the second command to generate a result, and provide a result of the operation to the one second port.

2. The slave device of claim 1, further comprising a memory storing the ARP address, wherein the controller loads the ARP address from the memory upon boot up of the slave device.

3. The slave device of claim 1, wherein the controller generates unique device identifiers (UDIDs) corresponding to the endpoints and generates an ARP table that represents a correspondence relationship between the endpoints and the UDIDs.

4. The slave device of claim 3, wherein the first commands include a getUDID command from the host requesting a UDID and the controller transmits a next one of the UDIDs to the host each time the controller receives the getUDID command until all the UDIDs have been transmitted.

5. The slave device of claim 4, wherein the first commands include an assign address command from the host assigning one of the UDIDs a corresponding one of the slave addresses.

6. The slave device of claim 1, wherein the controller is further configured to respond to at least one of the first commands by outputting an ARP response through only the first port.

7. An operation method of a slave device comprising a first port, a plurality of second ports, and a plurality of endpoints corresponding to the second ports, the operation method comprising:
assigning, by a controller of the slave device, an address resolution protocol (ARP) address to only the first port to configure the first port as a dedicated ARP port to receive an ARP related message from a host;
receiving, by the controller, ARP commands from the host through the dedicated ARP port; and
assigning, by the controller, slave addresses to the endpoints based on the ARP commands to enable the second ports to communicate with the host.

8. The operation method of claim 7, further comprising:
generating, by the controller, unique device identifiers (UDIDs) corresponding to the endpoints; and
generating, by the controller, an ARP table that represents a correspondence relationship between the endpoints and the UDIDs.

9. The operation method of claim 8, wherein the ARP commands include a get UDID command and the method includes the controller transmitting any one UDID among the UDIDs to the host via the ARP dedicated port with reference to the ARP table, in response to the get UDID command.

10. The operation method of claim 9, wherein the transmitting of the any one UDID among the UDIDs to the host via the ARP dedicated port comprises waiting to receive a next ARP command without transmitting the any one UDID to the host, when all of the UDIDs are transmitted to the host.

11. The operation method of claim 8, wherein the assigning of the slave addresses to the endpoints comprising:
comparing the UDIDs of the ARP table with a UDID received along with one of the ARP commands;
when an $N^{th}$ UDID among the UDIDs of the ARP table matches the received UDID, obtaining the $N^{th}$ endpoint corresponding to the $N^{th}$ UDID among the endpoints with reference to the ARP table; and
assigning the $N^{th}$ slave address to the obtained $N^{th}$ endpoint,
wherein N is a natural number greater than 0.

12. The operation method of claim 11, wherein the assigning of the slave addresses further comprises storing the $N^{th}$ slave address in the ARP table to represent a correspondence relationship between the $N^{th}$ endpoint and the Nth slave address.

13. The operation method of claim 12, further comprising the controller erasing the slave addresses stored in the ARP table in response to an ARP command received from the host via the ARP dedicated port.

14. The operation method of claim 7, further comprising the controller removing the assignment of the slave addresses to the respective second ports in response to an ARP command received from the host.

15. The operation method of the claim 7, further comprising communicating with the host via the second ports to which the slave addresses are assigned.

16. The operation method of claim 7, wherein the host and the slave device are connected via a bus, and the bus is one of a system management (SM) bus and an inter-integrated circuit (I2C).

17. The operation method of claim 7, wherein the slave device further comprises a memory subsystem configured to perform a certain memory operation and an information device configured to store vital product data (VPD), and the endpoints comprises at least one endpoint corresponding to the memory subsystem and at least one endpoint corresponding to the information device.

18. An operation method of a solid state drive (SSD) comprising a plurality of ports, a plurality of endpoints corresponding to the ports, and a controller to assign respective slave addresses to the endpoints, the operation method of the SSD, comprising:
assigning, by the controller, an address resolution protocol (ARP) address to only a single port among the ports to configure an ARP dedicated port to receive an ARP related message;
receiving, by the controller, the ARP related message from a host via the ARP dedicated port; and
performing, by the controller, the ARP based on the ARP related message.

19. The operation method of the SSD of claim 18, further comprising:
generating, by the controller, unique device identifiers (UDIDs) corresponding to the endpoints; and
generating, by the controller, an ARP table that represents a correspondence relationship between the endpoints and the UDIDs.

20. The operation method of the SSD of claim 19, further comprising transmitting any one UDID among the UDIDs to the host via the ARP dedicated port with reference to the ARP table when the ARP related message comprises a first ARP command.

* * * * *